July 5, 1932. W. F. HEINEMAN 1,866,257

METHOD OF ELECTRICALLY WELDING TUBULAR ARTICLES

Original Filed Dec. 1, 1930

INVENTOR.
Warren F. Heineman
BY
ATTORNEY.

Patented July 5, 1932

1,866,257

UNITED STATES PATENT OFFICE

WARREN F. HEINEMAN, OF SHOREWOOD, WISCONSIN, ASSIGNOR TO A. O. SMITH CORPORATION, OF MILWAUKEE, WISCONSIN, A CORPORATION OF NEW YORK

METHOD OF ELECTRICALLY WELDING TUBULAR ARTICLES

Application filed December 1, 1930, Serial No. 499,210. Renewed January 28, 1932.

The invention relates to a method of electrically welding tubular articles and particularly to the method of welding the longitudinal seam of a tubular article formed of sheet metal wherein the welding current is applied across the contacting edges of the seam as in electrical resistance welding.

In such method, electrodes are arranged to contact with the portions of the blank adjacent the edges to be welded on opposite sides of the seam, while separate means are provided to press the edges together for welding the same.

The object of the present invention is to provide a method in which the electrodes arranged adjacent the seam do not receive injurious pressures transmitted thereto through the walls of the blank from the pressure means above referred to.

This application and copending application Serial No. 362,722, filed May 13, 1929, are continuations in part of application Serial No. 244,026, filed December 31, 1927, by the present inventor.

An embodiment of the invention is illustrated in the accompanying drawing in which.

In the manufacture of large diameter pipe and other tubular articles from sheet metal, it has been found that, where the pipe is formed circular, the pressure applied to the side walls of the pipe during the upsetting of the edges in welding is transmitted radially outward equally throughout the circumference of the pipe and that the electrodes which are arranged adjacent the edges to be welded receive a very substantial pressure from the walls of the blank during the welding operation.

Where the electrodes are made of soft metal, such as copper, it being very expensive to make the electrodes of harder alloy metals, it has been found that the repeated welding operations necessary for the manufacture of such articles on a commercial basis soon deform the surfaces of the electrode by reason of the excessive pressure applied thereto during the upsetting of the edges in welding and that the electrodes or the contact surfaces thereof have to be replaced frequently.

Applicant overcomes this difficulty and expense in the present invention by forming the tubular blank to a shape which will not transmit all of the upsetting pressures from the side pressure means to the electrodes.

Figure 1:
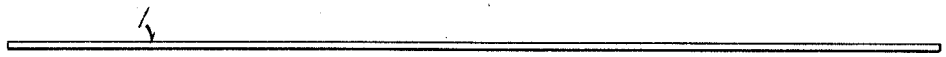
Figure 1 is an end view of a thin sheet of metal from which the pipe or tubular article is made.
Figure 2:
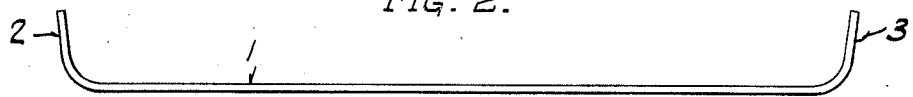
Fig. 2 is an end view of the same sheet of metal after the first bending operation.
Figure 3:
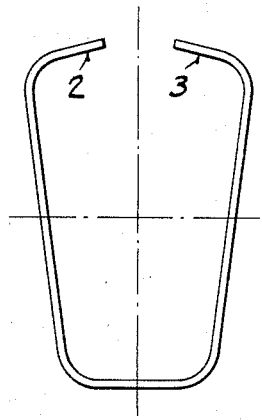
Fig. 3 is an end view of the sheet after the final bending operation.

In carrying out the invention, the side edges of the flat sheet of metal 1 from which the article is to be made are first bent to form obtuse flanges 2 and 3, respectively, with the main body of the sheet, as shown in Fig. 2. The sheet is then bent in the center, or approximately so, as shown in Fig. 3, to form a non-circular tubular blank having a major and minor cross-sectional axis, the marginal flanges 2 and 3 extending substantially in the same direction as the minor axis and the edges to be welded being separated by a gap bi-sected by the major axis of the blank. The blank so formed is then positioned in the welding machine, diagrammatically illustrated in Fig. 4.

The machine in general comprises a base or support 4 for the blank, having side indexing members 5 for positioning the blank with respect to the movable parts of the machine, vertically movable electrodes 6 and 7 adapted to press against the flanges 2 and 3 respectively of the blank and to conduct the welding current thereto, and laterally movable side pressure members 8 and 9 disposed near the top of the blank for pressing the edges together and welding the same.

Figure 4:
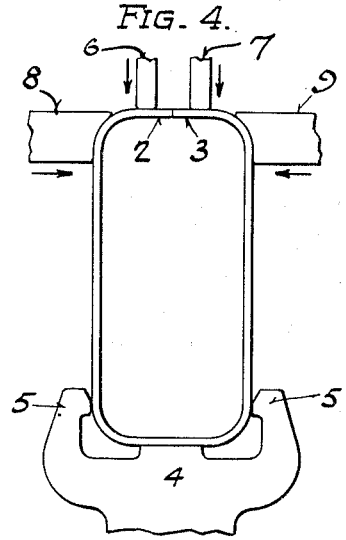
Fig. 4 is a diagrammatic illustration of the welding operation.

After the blank is inserted in the apparatus with the edges to be welded positioned at the top, the pressure members are moved relatively toward each other to close the gap between the edges to be welded and press said edges together. Simultaneously therewith the electrodes 6 and 7 are caused to press the marginal flanges 2 and 3 downwardly to cause the edges to align and to bring said flanges into a horizontal plane and parallel to the line of movement of the side pressure members, as shown in Fig. 4. The welding current is then applied to the blank through the electrodes and across the edges to be welded to heat the same to welding temperature.

The pressure members 8 and 9 apply a welding pressure to the edges during the heating period. This pressure is transmitted from the side pressure members 8 and 9 through the flanges 2 and 3 to the welding edges in a horizontal direction and has substantially no component in a vertical direction capable of creating excessive pressure against the electrodes 6 and 7.

The electrode pressures remain substantially constant during the application of the electrodes and depend upon the amount of flexing of the flanges 2 and 3 at the time of first aligning of the edges for welding.

Figure 5:
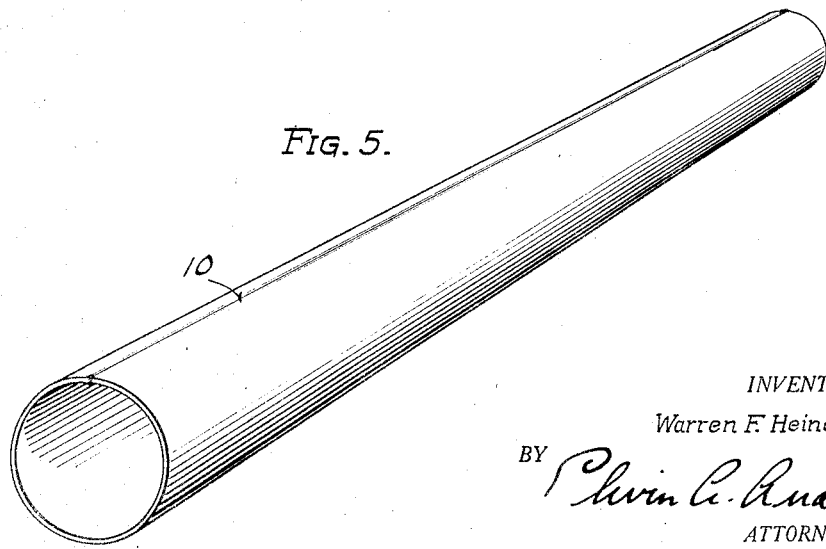
Fig. 5 is a perspective view of the finished article.

After the article has been welded, it may be formed in any suitable manner into circular cross-section, as shown in Fig. 5, with the weld 10 extending longitudinally thereof.

The invention is applicable to progressive welding methods as well as to methods in which all points along the entire length of the seam are welded simultaneously.

I claim:

1. The method of electric welding a longitudinal seam of a tubular article, comprising forming the tubular blank to provide straight flange portions adjacent the edges, applying pressure to said blank in a direction to press the edges together while applying electrodes to said flange portions adjacent to the edges in a direction substantially perpendicular to the direction of said pressure application to the blank to thereby deflect said flange portions inwardly until said portions lie in a plane substantially parallel to the direction of said pressure application to the blank, applying welding current through said electrodes to the blank and across said edges to heat the same to welding temperature, and applying welding pressure to the blank in the direction of said flange portions to press the edges together and weld the same.

2. The method of electric resistance welding a single longitudinal seam of a tubular article, comprising forming the tubular blank with major and minor axes and with straight flange portions adjacent the edges extending in substantially the same direction as the minor axis of the blank, applying pressure to said blank in the same direction as the minor axis of the blank to press the edges together while applying electrodes to said flange portions in the same direction as the major axis of the blank, and applying welding current through said electrodes to the blank and across said edges to heat the same to welding temperature while applying welding pressure to the blank in the direction of said flange portions to weld said edges together.

3. The method of manufacturing pipe, comprising the steps of turning up the side margins of a metal sheet to form stiff, narrow flanges standing at an angle to the plane of the sheet, bending the sheet to form a tubular blank of oblong cross-section with the longitudinal edges of the flanges separated by a gap at one of the sides of the structure in its lesser diameter, applying pressure to opposite sides of the structure in the direction of its lesser diameter to bring the longitudinal edges together under pressure for welding, while applying electrodes to the marginal flange portions adjacent the edges and exerting pressure on the same in a direction of the major axis of the blank to deflect said flange portions inwardly until said portions lie in a plane substantially parallel to the minor axis of the blank, and passing an electric current through said electrodes to the blank and across said edges to heat the same to welding temperature while applying the welding pressure to the blank in the same direction as the minor axis to press the edges together and weld the same.

In witness whereof I have signed my name at Milwaukee, Wisconsin, this 29th day of November, 1930.

WARREN F. HEINEMAN.